(12) United States Patent
Tomiyama

(10) Patent No.: US 11,232,338 B2
(45) Date of Patent: Jan. 25, 2022

(54) RADIO TAG COMMUNICATION DEVICE, RADIO TAG COMMUNICATION METHOD, AND IMAGE FORMING APPARATUS

(71) Applicant: TOSHIBA TEC KABUSHIKI KAISHA, Tokyo (JP)

(72) Inventor: Takashi Tomiyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/150,506

(22) Filed: Jan. 15, 2021

(65) Prior Publication Data

US 2021/0232882 A1    Jul. 29, 2021

(30) Foreign Application Priority Data

Jan. 28, 2020 (JP) .............................. JP2020-011481

(51) Int. Cl.
*G06K 19/07* (2006.01)
*G06K 7/10* (2006.01)

(52) U.S. Cl.
CPC ..... *G06K 19/0712* (2013.01); *G06K 7/10217* (2013.01); *G06K 7/10297* (2013.01)

(58) Field of Classification Search
CPC .......... G06K 19/0712; G06K 7/10297; G06K 7/10217; G06K 7/10198; G06K 7/10019; G06K 7/10366; G06Q 10/087; G06F 16/245

USPC ........................................................ 340/10.1
See application file for complete search history.

(56) References Cited

U.S. PATENT DOCUMENTS

| 10,083,330 | B2 * | 9/2018 | Horst ................. G06K 7/10128 |
| 2007/0126558 | A1 * | 6/2007 | Donato ............. G06K 17/0025 340/10.51 |
| 2013/0043983 | A1 * | 2/2013 | Lee .......................... G06K 1/18 340/10.51 |

FOREIGN PATENT DOCUMENTS

JP    2007058418 A    3/2007

* cited by examiner

*Primary Examiner* — Vernal U Brown
(74) *Attorney, Agent, or Firm* — Kim & Stewart LLP

(57) ABSTRACT

According to one embodiment, a radio tag communication device includes an antenna configured to transmit an interrogation signal and receive a response signal from a radio tag transmitting the response signal in response to the interrogation signal. A radio tag communication control unit of the device is configured to cause the antenna to repeatedly transmit the interrogation signal from a start time of an object conveyance until a reception strength of the response signal received by the antenna is equal to or greater than a predetermined threshold, and then perform writing on the radio tag via the antenna once the reception strength of the response signal received by the antenna is equal to or greater than the predetermined threshold.

20 Claims, 8 Drawing Sheets

RADIO TAG COMMUNICATION DEVICE, RADIO TAG COMMUNICATION METHOD, AND IMAGE FORMING APPARATUS

CROSS-REFERENCE TO RELATED APPLICATION

This application is based upon and claims the benefit of priority from Japanese Patent Application No. 2020-011481, filed on Jan. 28, 2020, the entire contents of which are incorporated herein by reference.

FIELD

Embodiments described herein relate generally to a radio tag communication device, a radio tag communication method, and an image forming apparatus.

BACKGROUND

There are image forming apparatuses capable of forming images on sheets having radio identification (RFID) tags (or "radio tags") therein. Such an image forming apparatus includes a radio tag communication device that communicates with the radio tag. In some such an image forming apparatuses, the radio tag communication device can write information to a radio tag while a sheet is being transported.

However, it can be difficult for the image forming apparatus to appropriately notify the radio tag communication device of the timing at which the information should be written to the radio tag. The radio tag communication device may not sufficiently transmit a signal to the radio tag to write the information to the radio tag. As a result, writing the information to the radio tag may fail in some cases. Such a problem is not limited to only a sheet being conveyed in the image forming apparatus and arises in other cases. For example, in any situation in which information is to be written to a radio tag moving with respect to a radio tag communication device, a similar problem occurs. As one specific example, a similar problem can occur with a ticket gate that writes information to an integrated circuit (IC) card for mass transit systems or the like.

DETAILED DESCRIPTION

At least one embodiment provides a radio tag communication device, a radio tag communication method, and an image forming apparatus capable of reducing the frequency of writing failures when writing information to a radio tag which is being moved.

In general, according to one embodiment, a radio tag communication device includes an antenna and a radio tag communication control unit. The antenna is configured to transmit an interrogation signal and receive a response signal from a radio tag transmitting the response signal in response to the interrogation signal. The radio tag communication control unit is configured to cause the antenna to repeatedly transmit the interrogation signal from a start time of an object conveyance until a reception strength of the response signal received by the antenna is equal to or greater than a predetermined threshold, and then perform writing on the radio tag via the antenna once the reception strength of the response signal received by the antenna is equal to or greater than the predetermined threshold.

Hereinafter, a radio tag communication device, a radio tag communication method, and an image forming apparatus according to an example embodiment will be described with reference to the drawings.

First, an image forming apparatus according to an embodiment will be described with reference to FIG. 1.

Figure 1:
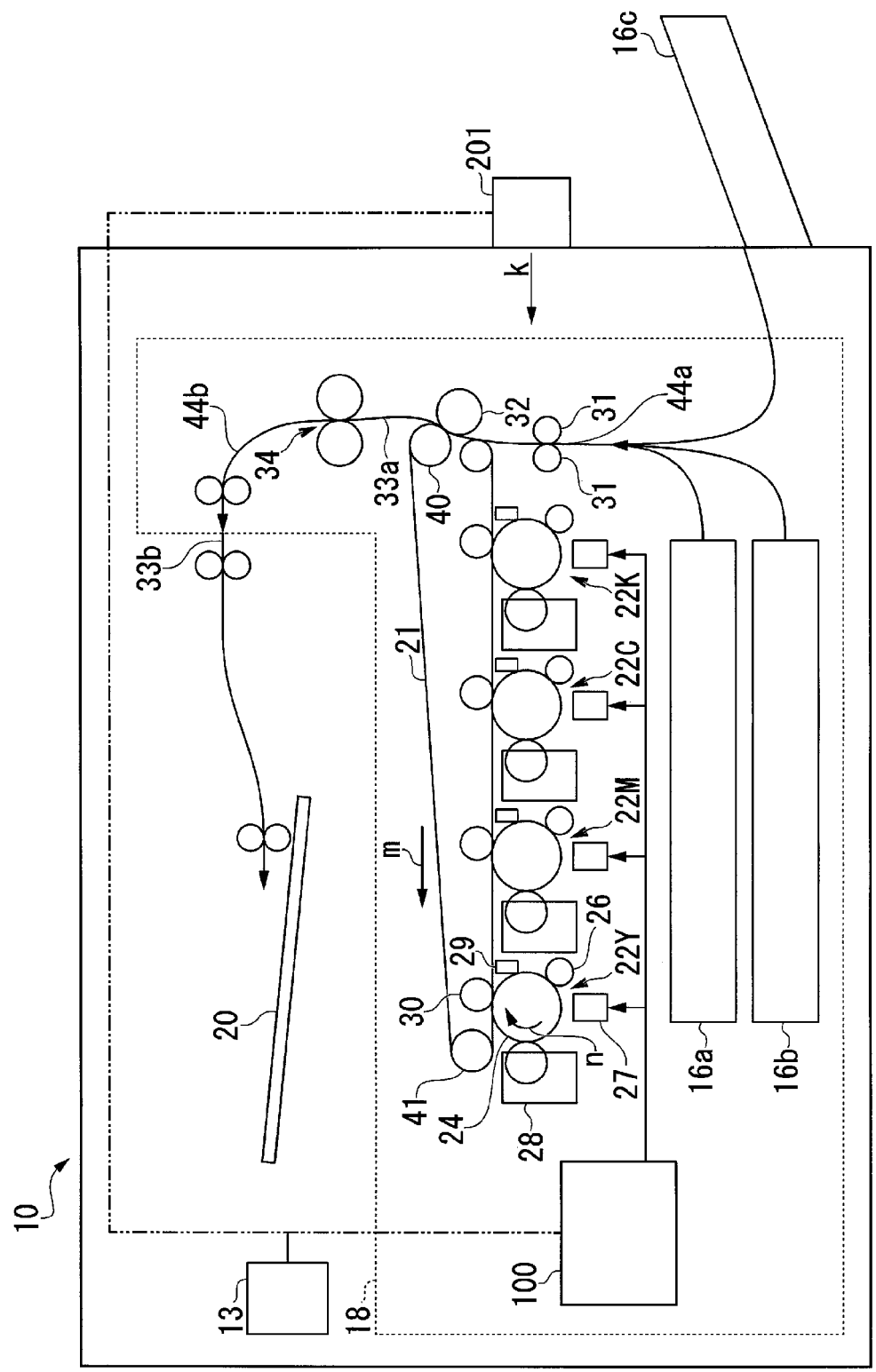
FIG. 1 is a side view depicting an image forming apparatus according to an embodiment.

Referring to FIG. 1, an image forming apparatus 10 includes a control panel 13, a radio tag communication device 201, and a printer unit 18. The printer unit 18 includes a control unit 100 and sheet feeding cassettes 16a and 16b. The control unit 100 controls the control panel 13, the radio tag communication device 201, and the printer unit 18. The control unit 100 controls conveyance of a sheet in the printer unit 18. The conveyance of the sheet is controlled by controlling a timing at which the sheet is conveyed, a position at which the sheet is stopped, a speed at which the sheet is conveyed, and the like.

The control panel 13 includes an input key and a display unit. For example, the input key receives an input performed by a user. For example, the display unit is a touch panel type display. The display unit receives an input performed by the user and displays information and user interface screens to the user. For example, the control panel 13 displays a means for setting an adjustable parameter regarding an operation of the image forming apparatus 10 on the display unit so that the adjustable parameter can be set by the user as preferred. The control panel 13 notifies the control unit 100 of the setting and/or selection by the user.

The sheet feeding cassettes 16a and 16b store sheets having radio tags therein or thereon. The sheet feeding cassettes 16a and 16b can, of course, store sheets with no radio tags. In the following description, all referenced sheets are assumed to be sheets with radio tags unless otherwise noted. As the sheets, for example, materials such as paper or plastic films can be used.

The printer unit 18 performs an image forming operation. For example, the printer unit 18 prints an image corresponding to supplied image data on a sheet. The printer unit 18 includes an intermediate transfer belt 21. In the printer unit 18, the intermediate transfer belt 21 is supported by a driven roller 41, a backup roller 40, and the like. In the printer unit 18, the intermediate transfer belt 21 is rotated in an arrow m direction.

The printer unit 18 includes four image forming stations 22Y, 22M, 22C, and 22K. The image forming stations 22Y, 22M, 22C, and 22K form images of Y (yellow), M (magenta), C (cyan), and K (black), respectively. The image forming stations 22Y, 22M, 22C, and 22K are disposed below the intermediate transfer belt 21 along a rotation direction of the intermediate transfer belt 21.

Hereinafter, the image forming station 22Y of Y (yellow) among the image forming stations 22Y, 22M, 22C, and 22K will be described as an example. Since the image forming stations 22M, 22C, and 22K have a similar configuration to the image forming station 22Y, the detailed description thereof will be omitted.

The image forming station 22Y includes an electrostatic charger 26, an exposure scanning head 27, a development device 28, and a photoreceptor cleaner 29. The electrostatic charger 26, the exposure scanning head 27, the development device 28, and the photoreceptor cleaner 29 are disposed around a photosensitive drum 24 rotating in an arrow n direction.

The image forming station 22Y includes a primary transfer roller 30. The primary transfer roller 30 faces the photosensitive drum 24 with the intermediate transfer belt 21 interposed therebetween.

In the image forming station 22Y, the photosensitive drum 24 is charged by the electrostatic charger 26, and then is exposed by the exposure scanning head 27. In the image forming station 22Y, an electrostatic latent image is formed on the photosensitive drum 24. The development device 28 develops the electrostatic latent image on the photosensitive drum 24 using a developer of two components (toner and carrier).

The primary transfer roller 30 transfers a toner image from the photosensitive drum 24 to the intermediate transfer belt 21. In the image forming stations 22Y, 22M, 22C, and 22K, different color toner images are respectively transferred to the intermediate transfer belt 21 by the respective primary transfer rollers 30. The color toner images are formed by sequentially overlapping toner images of Y (yellow), M (magenta), C (cyan), and K (black). The photoreceptor cleaner 29 removes toner remaining on the photosensitive drum 24 after the primary transfer.

The printer unit 18 includes a secondary transfer roller 32. The secondary transfer roller 32 faces the backup roller 40 with the intermediate transfer belt 21 interposed therebetween. The secondary transfer roller 32 transfers the color toner images, collectively, from the intermediate transfer belt 21 to a sheet. A "toner image" referenced in the following description may include multiple color toner images together or a toner image of only one color. The toner image may also be a toner image formed using a decolorable toner, which can comprise a heat sensitive dye or the like.

A conveyance path 33a extends from a joining portion 44a to a branching portion 44b. The conveyance path 33a is an example of a conveyance unit. A conveyance path 33b extends from the branching portion 44b to a discharging tray 20.

The front end of a sheet fed from the sheet feeding cassette 16a, the sheet feeding cassette 16b, or a manual sheet input tray 16c travels to the two register rollers 31, which are in contact with each other. An angle of the sheet can be corrected at the register rollers 31. The control unit 100 controls the timing of the start of rotating the register rollers 31 to match the positions of the toner images on the rotating intermediate transfer belt 21 and thus the sheet moves to the position of the secondary transfer roller 32 at an appropriate time to receive the toner image (s) from the intermediate transfer belt 21. The toner images formed on the intermediate transfer belt 21 are transferred to the sheet at the secondary transfer roller 32. The sheet is then conveyed along the conveyance path 33a by the operations of the control unit 100 and a fixing device 34 fixes the transferred toner image to the sheet. The control unit 100 then conveys the sheet to the conveyance path 33b for discharge.

The radio tag communication device 201 can communicate with the control unit 100. The radio tag communication device 201 reads information from a radio tag of the sheet and writes information to the radio tag by receiving signals from, and sending signals to, the radio tag. The radio tag communication device 201 transmits a signal primarily in an arrow k direction.

Before the image has been formed on the sheet, the radio tag communication device 201 repeatedly attempts a tag detection process until a tag detection end condition is satisfied. The tag detection process is a process of determining whether the radio tag is within a tag detection area or range. The tag detection area is an area for which a fail probability for writing to the radio tag is lower than some predetermined probability threshold. When a tag detection end condition is met the tag detection process ends. Here, the tag detection end condition is met when the radio tag is detected within the tag detection area. More specifically, the tag detection end condition is met when a reflection signal reception strength from a response signal from the radio tag is equal to or greater than some predetermined strength threshold.

The tag detection process includes a detection signal transmission process and a reflection strength determination process. The detection signal transmission process is a process of radiating a radio wave (referred to as a "detection signal") from the radio tag communication device 201 to detect a radio tag. The detection signal is a radio wave for conveying a predetermined signal used for the tag detection process. The reflection strength determination process is a process that is performed after the detection signal transmission process when the radio tag communication device 201 receives a reflected wave (referred to as a "response signal") corresponding to the detection signal within a predetermined period after the detection signal transmission process was performed.

Specifically, the response signal is the detection signal reflected back from the radio tag. The response signal indicates the detection signal was received by the radio tag. The response signal conveys identification information identifying the responding/reflecting radio tag. The radio tag responds to the detection signal by superimposing the identification information with the reflected wave. The radio tag starts a process of transmitting the response signal when predetermined information used for the tag detection process is received.

The reflection strength determination process is a process of determining whether a reflected wave reception strength is equal to or greater than a predetermined strength threshold (referred to as a "writing threshold") when the radio tag communication device 201 receives the response signal within a predetermined period after the detection signal transmission process was performed. The reflected wave reception strength is a strength (a received signal strength indicator (RSSI)) of the response signal as received by the radio tag communication device 201.

Specifically, the tag detection area is a region of a space from which the reflected wave reception strength (RSSI) will be equal to or greater than the writing threshold when the radio tag communication device 201 receives a response signal from a radio tag located within the region. The fact that the reflected wave reception strength is equal to or greater than the writing threshold means that the detection signal transmitted from the radio tag communication device 201 arrives at the radio tag at some predetermined strength or more. Therefore, when the reflected wave reception strength is equal to or greater than the writing threshold, the radio tag communication device 201 can supply a radio tag with signal power at which writing is unlikely to fail.

The radio tag communication device 201 performs writing to the radio tag once the radio tag is detected within the tag detection area through the tag detection process.

With regard to an image formed in the printer unit 18, electrostatic latent images are formed on the photosensitive drums 24 from the exposure scanning heads 27 before the secondary transfer at the secondary transfer roller 32. The electrostatic latent images formed on the photosensitive drums 24 are primarily transferred as toner images to the intermediate transfer belt 21. Further, the toner images primarily transferred to the intermediate transfer belt 21 are subsequently transferred to the radio tag sheet that has been conveyed to the register rollers 31.

Next, a block diagram of an image forming apparatus according to an embodiment will be described with reference to FIG. 2.

Figure 2:
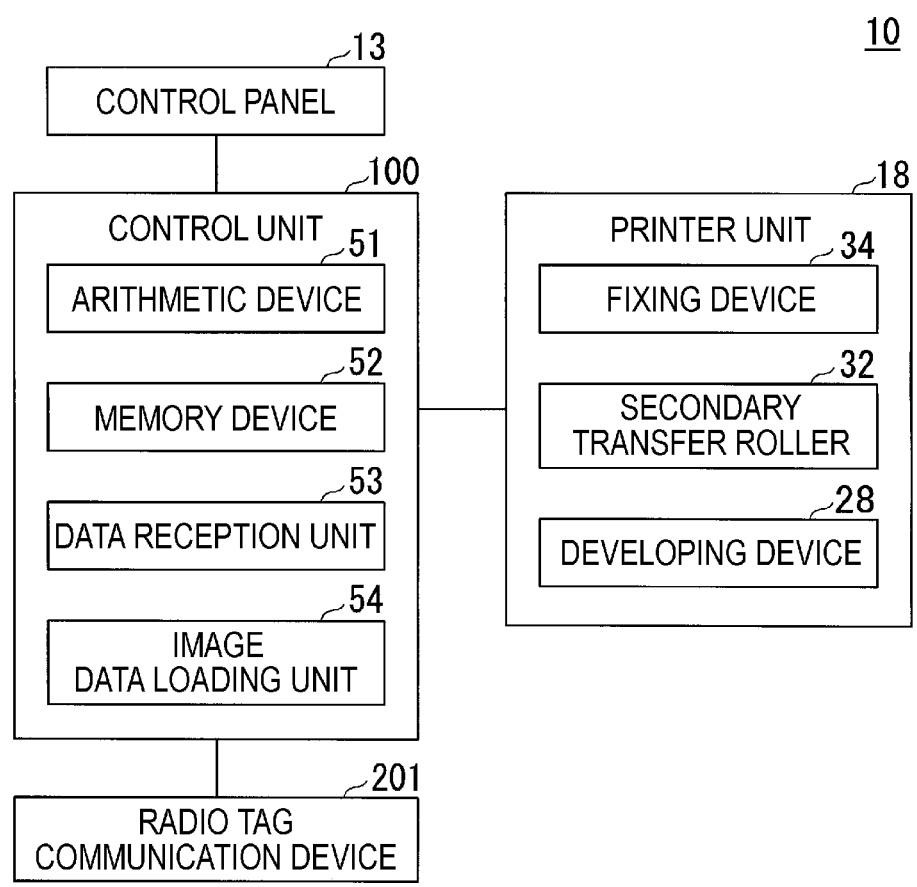
FIG. 2 is a functional block diagram illustrating aspects of an image forming apparatus according to an embodiment.

In FIG. 2, the image forming apparatus 10 includes a control unit 100, a control panel 13, a printer unit 18, and a radio tag communication device 201.

The control unit 100 (also referred to as a controller) includes an arithmetic device 51 and a memory device 52. The arithmetic device 51 operates to control the control panel 13, the printer unit 18, and the radio tag communication device 201 in accordance with an image processing program stored in the memory device 52. The control unit 100 outputs, for example, information indicating that conveyance of the sheet has started (hereinafter referred to as "conveyance start information").

The arithmetic device 51 is, for example, a central processing unit (CPU) or an application specific integrated circuit (ASIC). The memory device 52 is, for example, a read-only memory (ROM), a random access memory (RAM), a hard disk drive (HDD), or a solid-state drive (SSD). A data reception unit 53 receives printing data (for example, data described in a page description language) indicating an image to be printed. The printing data can be received from a host device such as a personal computer (PC). The data reception unit 53 stores the received printing data in the memory device 52. An image data loading unit 54 loads data (for example, raster data) which can be printed by the printer unit 18 and stores the data in the memory device 52 by determining a printing condition (printer settings) from the printing data stored in the memory device 52 by the data reception unit 53.

The printer unit 18 includes a fixing device 34, a secondary transfer roller 32, and a developing device 28. The printer unit 18 forms the image on the sheet based on the data stored in the memory device 52 by the image data loading unit 54.

Figure 3:
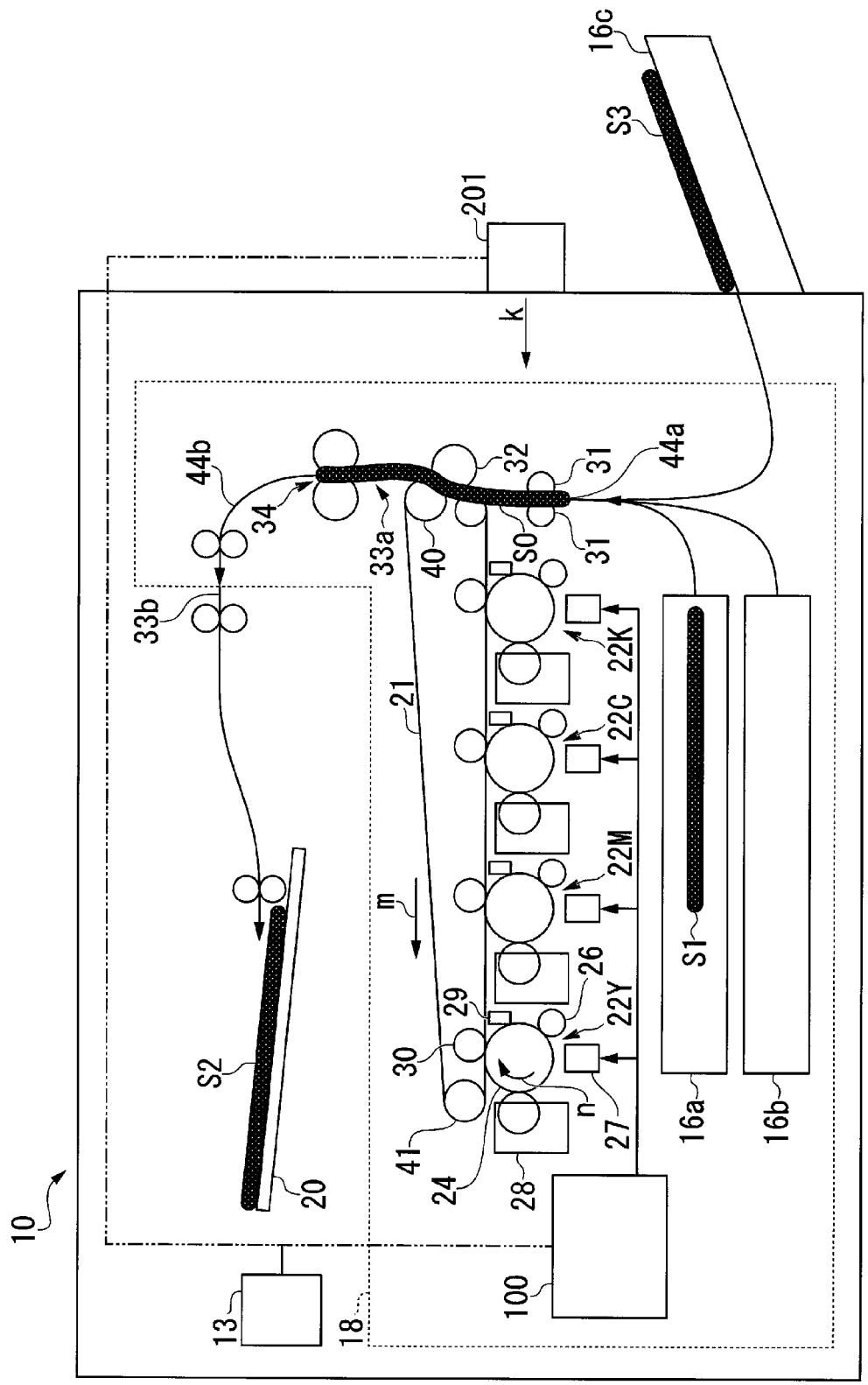
FIG. 3 is a diagram illustrating possible sheet positions in an image forming apparatus.

FIG. 3 is a diagram illustrating an example of positions at which a sheet can be located in the image forming apparatus 10 according to the embodiment. In FIG. 3, a sheet S1 is a sheet still in the feeding cassette 16a. A sheet S2 is a sheet on the discharging tray 20. A sheet S3 is a sheet on the input tray 16c. Collectively, feeding cassettes 16a and 16b, the discharging tray 20, and the input tray 16c are referred to as sheet storage locations.

A sheet S0 is a sheet which is presently being conveyed along the conveyance path 33a. A radio tag is provided on each sheet (S0, S1, S2, S3).

In FIG. 3, a sheet (hereinafter referred to as a "target sheet") having the radio tag to which information is to be written is a sheet being conveyed along the conveyance path 33a.

In FIG. 3, the radio tag communication device 201 transmits a detection signal in an arrow k direction. Each radio tag receiving the detection signal responds to the radio tag communication device 201. Thus, the radio tag communication device 201 receives a signal transmitted from a radio tag provided in each sheet within communication range of the radio tag communication device 201. In general, the RSSI for each radio tag differs depending on the position of the radio tag, directivity of the signal, or the like. In the case of FIG. 3, one of the radio tags receiving the signal is the radio tag provided in the sheet S0. In FIG. 3, the sheet S0 is being conveyed. Therefore, the strength (RSSI value) with which the radio tag communication device 201 receives a response signal from the radio tag provided in the sheet S0 changes with time (that is, while the sheet S0 moves along the conveyance path).

Figure 4:
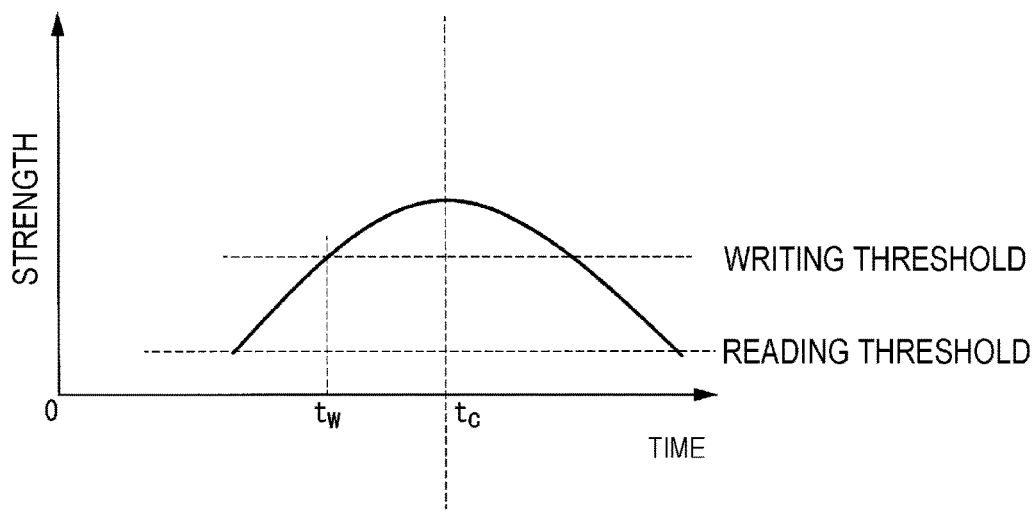
FIG. 4 is a graph depicting a change of a reflected wave reception strength over time.

FIG. 4 is a diagram illustrating an example of a time change of a reflected wave reception strength from sheet S0 according to the embodiment.

In FIG. 4, a time from the time origin (zero time) to a time $t_c$ is the time during which the radio tag approaches the radio tag communication device 201. In FIG. 4, the time after the time $t_c$ is the time during which the radio tag moves away from the radio tag communication device 201. FIG. 4 shows that the reflected wave reception strength becomes stronger while the radio tag approaches the radio tag communication device 201. FIG. 4 shows that the reflected wave reception strength becomes weaker while the radio tag moves away from the radio tag communication device 201.

FIG. 4 also shows that a writing threshold is greater than a reading threshold. The reading threshold is a strength at which the radio tag communication device 201 can detect a response signal.

In FIG. 4, a time $t_w$ is a time at which the reflected wave reception strength exceeds the writing threshold. The radio tag communication device 201 starts writing to the radio tag at the time $t_w$.

Figure 5:
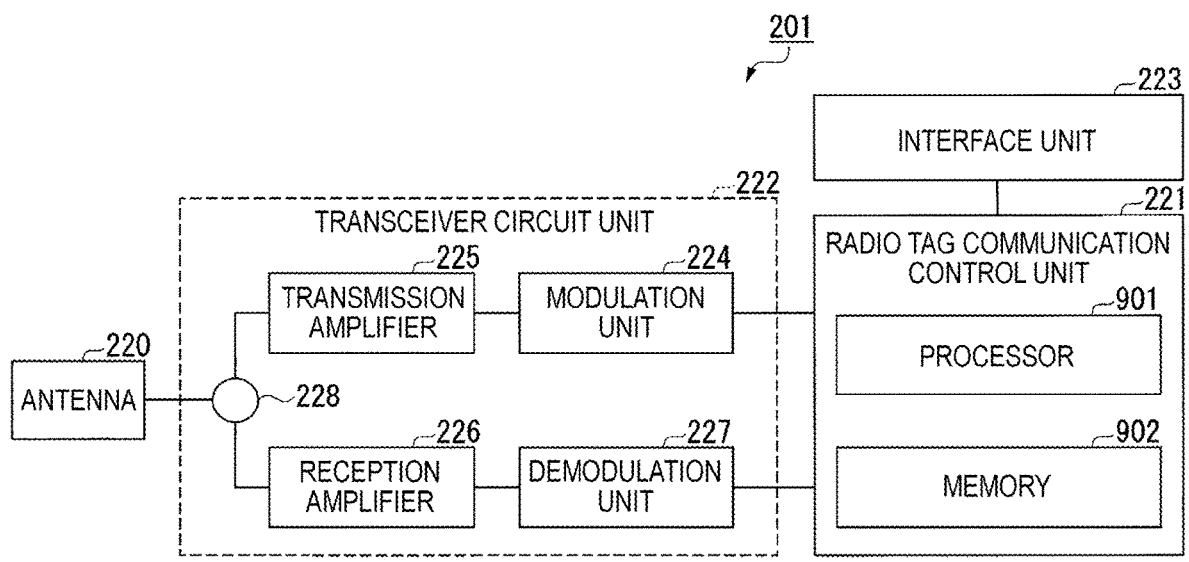
FIG. 5 depicts a configuration of a radio tag communication device.

FIG. 5 is a diagram illustrating an example of a configuration of the radio tag communication device 201 according to an embodiment.

The radio tag communication device 201 includes an antenna 220, a radio tag communication control unit 221, a transceiver circuit unit 222, and an interface unit 223.

The antenna 220 transmits a signal. The antenna 220 receives an arriving response signal. The signal transmitted by the antenna 220 is a modulated carrier radio wave. The signal received by the antenna 220 is also a modulated carrier radio wave.

The radio tag communication control unit 221 comprises a processor 901, such as a central processing unit (CPU), and a memory 902. The processor 901 executes a program stored in the memory 902. The radio tag communication control unit 221 controls operations of each functional unit included in the radio tag communication device 201. The writing threshold is stored in advance in the memory 902.

The radio tag communication control unit 221 receives, for example, conveyance start information for the sheet (s) being printed/conveyed.

The radio tag communication control unit 221 causes the radio tag communication device 201 to perform a detection signal transmission process, for example, by controlling the operation of each functional unit included in the radio tag communication device 201. Specifically, in the detection signal transmission process, the radio tag communication control unit 221 controls the operation of each functional unit included in the radio tag communication device 201 such that a detection signal (interrogation signal) is transmitted from the antenna 220. The radio tag communication control unit 221 then performs, for example, a reflection strength determination process.

For example, when the reflected wave reception strength exceeds the writing threshold, the radio tag communication control unit 221 controls a signal transmitted by the antenna 220 such that the writing is performed on the radio tag by controlling the operation of each functional unit included in the radio tag communication device 201. In this way, the radio tag communication control unit 221 performs the writing via the antenna 220. The signal transmitted by the antenna 220 to perform the writing on the radio tag is referred to as a writing signal. For example, the radio tag communication control unit 221 measures an elapsed time after the conveyance start information is received.

The transceiver circuit unit 222 includes a modulation unit 224, a transmission amplifier 225, a reception amplifier 226, a demodulation unit 227, and a circulator 228.

The modulation unit 224 modulates a radio wave radiated by the radio tag communication device 201. The modulated radio wave is radiated as the detection signal from the antenna 220. The transmission amplifier 225 controls the strength of a signal transmitted by the radio tag communication device 201. The circulator separates the radio wave (e.g., a detection signal) radiated from the antenna 220 from the radio wave (e.g., a tag response signal) received by the antenna 220. The reception amplifier 226 adjusts the strength of the signal received by the antenna 220 to a predetermined strength. The demodulation unit 227 demodulates the signal received by the antenna 220. The circulator 228 is a passive element that separates the detection signal and the response signal.

The interface unit 223 is an interface which electrically connects the radio tag communication control unit 221 to the control unit 100.

Figure 6:
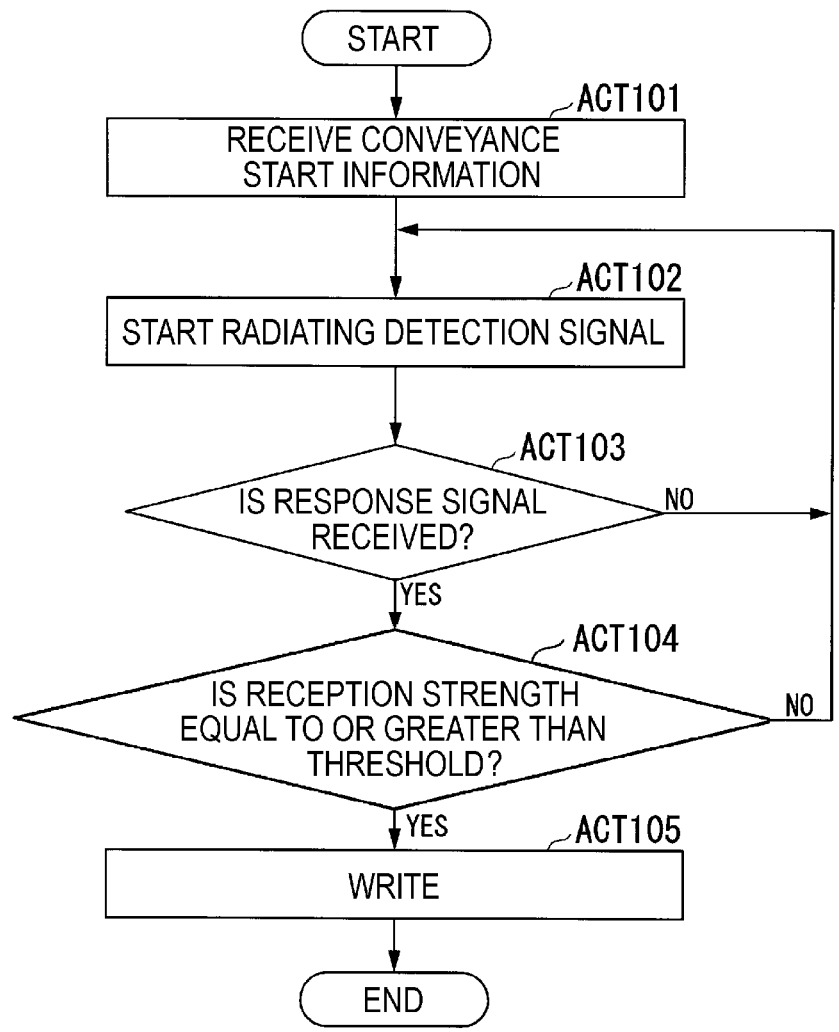
FIG. 6 is a flowchart of a process executed by a radio tag communication device in an embodiment.

FIG. 6 is a flowchart illustrating an example of a process executed by the radio tag communication device 201 according to an embodiment.

The radio tag communication control unit 221 receives the conveyance start information (ACT101). Subsequently, the antenna 220 transmits the detection signal under the control of the radio tag communication control unit 221 (ACT102). Subsequently, the radio tag communication control unit 221 determines whether the response signal is received (ACT103). Specifically, the radio tag communication control unit 221 determines whether the received strength is equal to or greater than the reading threshold. The radio tag communication control unit 221 determines that the response signal is received if the received strength is equal to or greater than the reading threshold. The radio tag communication control unit 221 determines that the response signal is not received if the received strength is less than the reading threshold.

If the response signal is not yet received (NO in ACT103), the process returns to ACT102. When the response signal is received (YES in ACT103), the radio tag communication control unit 221 then determines whether the reflected wave reception strength is equal to or greater than the writing threshold (ACT104). If the reflected wave reception strength is less than the writing threshold (NO in ACT104), the process returns to ACT102. If the reflected wave reception strength is equal to or greater than the writing threshold (YES in ACT104), the radio tag communication control unit 221 transmits a writing signal to the radio tag to write information (ACT105).

Figure 7:
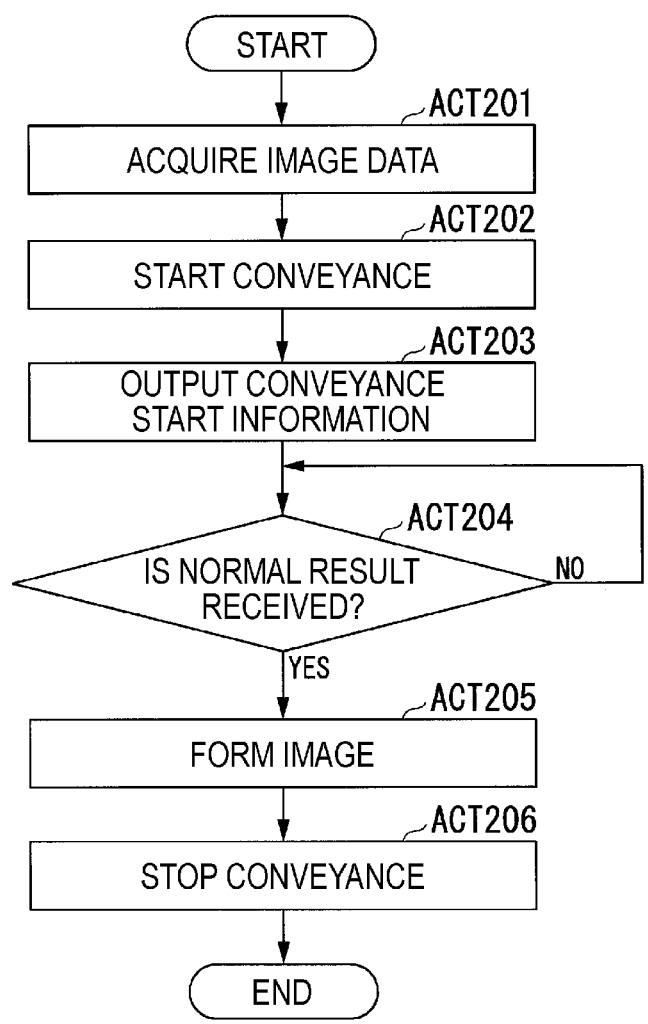
FIG. 7 is a flowchart of a process performed by an image forming apparatus of an embodiment.

FIG. 7 is a flowchart illustrating an example of a process performed by an image forming apparatus 10 according to an embodiment.

The control unit 100 acquires image data via the control panel (ACT201). Subsequently, the control unit 100 controls operations of the conveyance paths 33a and 33b such that conveyance of the sheet starts (ACT202). Through the process of ACT202, the sheet is conveyed. Subsequently, the control unit 100 outputs conveyance start information (ACT203). The control unit 100 determines, similarly to the processing of ACT104, whether the reflected wave reception strength is equal to or greater than the writing threshold (which is referred to as a "normal result") is received (ACT204). When the normal result is not received (NO in ACT204), the process returns to ACT204. Conversely, when the normal result is received (YES in ACT204), the printer unit 18 forms an image indicated by the image data (ACT205). Subsequently, the sheet is conveyed to the discharging tray 20 and the process of conveying the sheet is stopped (ACT206).

The image forming apparatus 10 includes the radio tag communication control unit 221 that causes the antenna 220 to transmit the detection signal repeatedly until the strength of the signal transmitted by the radio tag is equal to or greater than the writing threshold. Therefore, the image forming apparatus 10 can reduce the frequency at which a tag writing fails even for a technology in which the sheet with the radio tag which is being moved during the tag writing process.

Modification Examples

The radio tag communication device 201 may stop transmitting the detection signal if the tag detection end condition is not satisfied within some predetermined time or more after starting conveyance of a sheet.

Figure 8:
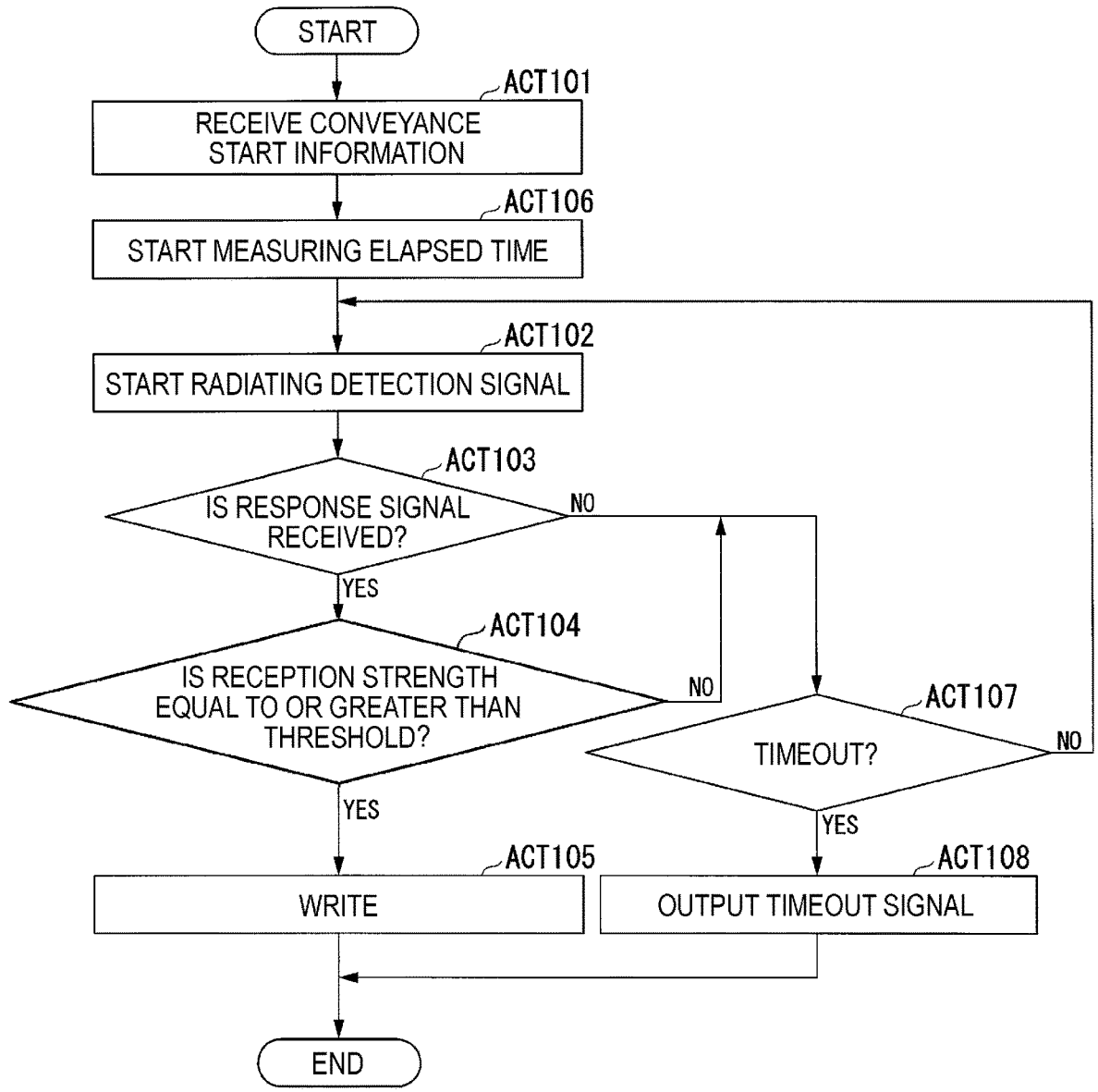
FIG. 8 is a flowchart of a process performed by a radio tag communication device according to a modification example.

FIG. 8 is a flowchart illustrating an example of a process performed by a radio tag communication device 201 according to a modification example. The same reference numerals to those of FIG. 6 are given to the same processes as those of FIG. 6 and the description of such processes will be omitted.

If the response signal is not yet received (NO in ACT103), the radio tag communication control unit 221 starts measuring the elapsed time after reception of the conveyance start information (ACT106). The radio tag communication control unit 221 determines whether the elapsed time since the reception of the conveyance start information is equal to or greater than a predetermined time (ACT107). When the elapsed time is less than the predetermined time (NO in ACT107), the process returns to ACT102. Conversely, when the elapsed time is equal to or greater than the predetermined time (YES in ACT107), the radio tag communication control unit 221 outputs a timeout signal to the control unit 100 (ACT108). The timeout signal is a signal indicating that the elapsed time is equal to or greater than the predetermined time. Similarly, if the reflected wave reception strength stays less than the writing threshold (NO in ACT104), the radio tag communication control unit 221 performs also the process of ACT107.

Figure 9:
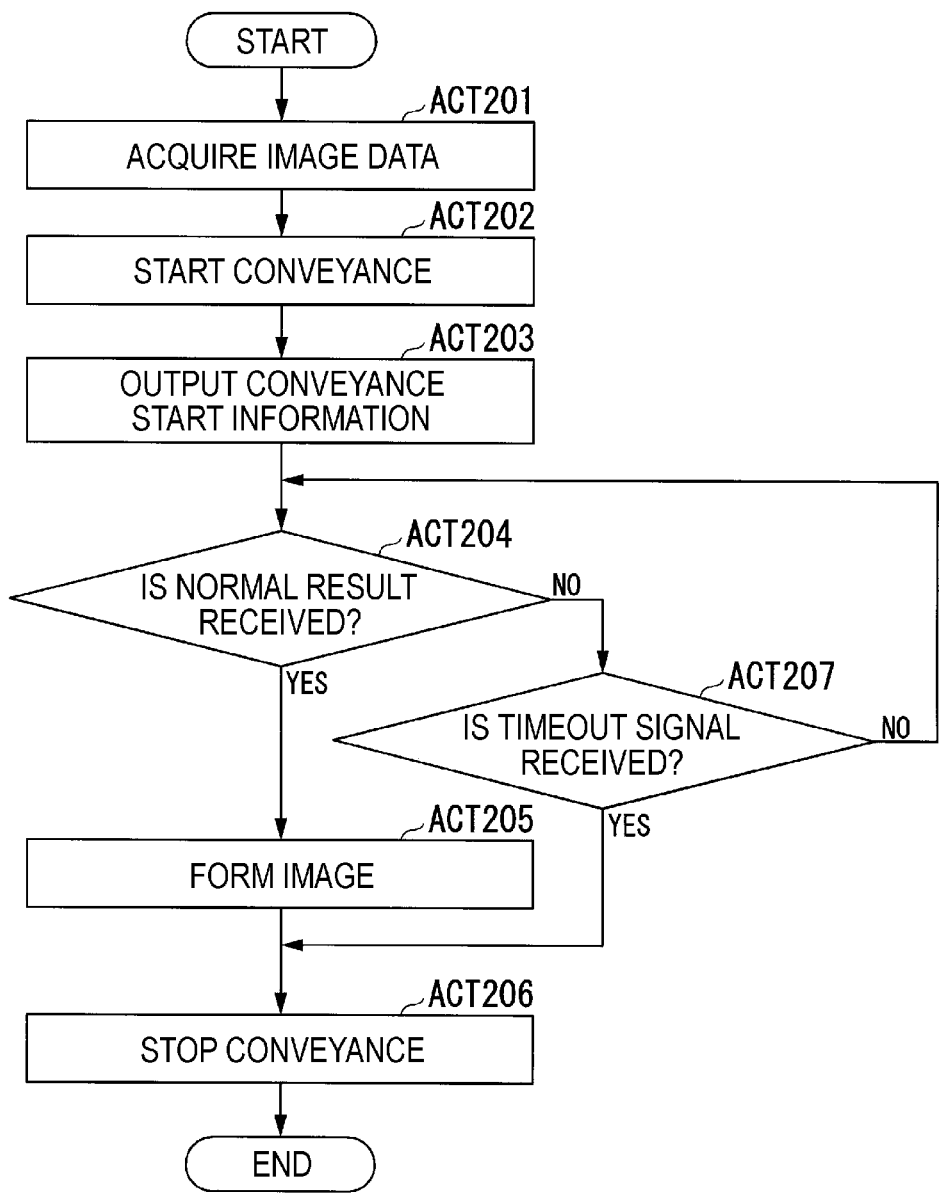
FIG. 9 is a flowchart of a process performed by an image forming apparatus according to a modification example.

FIG. 9 is a flowchart illustrating an example of a flow of a process performed by an image forming apparatus 10 according to a modification example. The same reference numerals to those of FIG. 7 are given to the same processes as those of FIG. 7 and the description will be omitted.

In FIG. 9, if the normal result is not yet received (NO in ACT204), the control unit 100 next determines whether the timeout signal has been received (ACT207). When the timeout signal has been received (YES in ACT207), the process of ACT206 is performed. Conversely, when the timeout signal is not received (NO in ACT207), the process returns to ACT204.

The image forming apparatus 10 according to the modification example includes the radio tag communication control unit 221 that causes the antenna 220 to transmit the detection signal repeatedly until the strength of the signal transmitted by the radio tag is equal to or greater than the writing threshold. Therefore, the image forming apparatus 10 according to the modification example can reduce the frequency at which the writing fails.

In some examples, the radio tag communication device 201 may not be necessarily provided within an image forming apparatus 10. The radio tag communication device 201 may be provided in another device (hereinafter referred to as an "attachment destination device") as long as the radio tag communication device 201 can still communicate with a radio tag provided in an object which is being conveyed (hereinafter referred to as a "conveyed object"). In such case, the conveyed object may be a contactless card (rather than a sheet per se). Such a contactless card can include an arithmetic device (e.g., an integrated circuit) that records a history of getting-on and getting-off of transport facilities (a mass transit ride history or the like), such as a subway or transit system contactless rider card. In this case, the attachment destination device may be, for example, a ticket gate for a transit system. In this case, the contactless card is carried by a person past the ticket gate or the like.

The detection signal is an example of an interrogation signal.

Certain functions of an image forming apparatus according to the above-described embodiments may be realized by a general-purpose computer. In this case, a program that realizes the functions may be recorded on a non-transitory computer-readable recording medium and the program recorded on the recording medium may be read to be realized by a computer system. A general-purpose computer mentioned here can include an operating system (OS) and/or additional hardware as peripheral devices. A "computer-readable recording medium" is a portable medium such as a flexible disk, a magneto-optical disk, a ROM, or a CD-ROM or a memory device such as a hard disk embedded in the computer system. A "non-transitory computer-readable recording medium" may be accessed via a communication circuit such as a telephone circuit or a network such as the Internet. A server may be utilized as a non-transitory computer-readable recording memory. A program may realize some of the above-described functions or in combination with another program recorded in advance in a computer or otherwise.

According to at least one of the above-described embodiments, the radio tag communication control unit 221 is be able to reduce the frequency at which the writing fails in a system in which tag writing must be performed on a radio tag which is being moved.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radio tag communication device, comprising:
   an antenna configured to transmit an interrogation signal and receive a response signal from a radio tag transmitting the response signal in response to the interrogation signal; and
   a radio tag communication control unit configured to cause the antenna to repeatedly transmit the interrogation signal from a start time of an object conveyance until a reception strength of the response signal received by the antenna is equal to or greater than a predetermined threshold, and then perform writing on the radio tag via the antenna once the reception strength of the response signal received by the antenna is equal to or greater than the predetermined threshold.

2. The radio tag communication device according to claim 1, wherein the radio tag communication control unit is configured to stop transmitting the interrogation signal if the reception strength is still less than the predetermined threshold after a predetermined time elapses after the start time of the object conveyance.

3. The radio tag communication device according to claim 1, wherein the object is a sheet of paper with the radio tag attached thereto.

4. The radio tag communication device according to claim 1, wherein the radio tag is a radio frequency identification (RFID) tag.

5. The radio tag communication device according to claim 1, wherein the object is a sheet of paper being conveyed within an image forming apparatus to which the radio tag communication device is attached.

6. The radio tag communication device according to claim 1, further comprising:
   a transceiver circuit connected between the antenna and the radio tag communication control unit.

7. The radio tag communication device according to claim 1, wherein the radio tag communication control unit comprises a processor and a memory.

8. The radio tag communication device according to claim 1, further comprising:
   an interface unit connecting the radio tag communication control unit to a printer control unit, wherein
   a signal from the printer control unit received by the interface unit indicates the start time of the object conveyance.

9. A radio tag communication method, comprising:
   repeatedly transmitting an interrogation signal from a start time of an object conveyance until a reception strength of a response signal received from a radio tag on the object in response to the interrogation signal is equal to or greater than a predetermined threshold; and
   performing a writing on the radio tag once the reception strength of the received response signal is equal to or greater than a predetermined threshold.

10. The radio tag communication method according to claim 9, further comprising:
    stopping transmission of the interrogation signal if the reception strength of the response signal is still less than the predetermined threshold after a predetermined time elapses after the start time of the object conveyance.

11. The radio tag communication method according to claim 9, wherein the object is a sheet of paper with the radio tag attached thereto.

12. The radio tag communication method according to claim 9, wherein the radio tag is a radio frequency identification (RFID) tag.

13. The radio tag communication method according to claim 9, wherein the object is a sheet of paper being conveyed within an image forming apparatus to which the radio tag communication device is attached.

14. The radio tag communication method according to claim 9, further comprising:
   receiving a signal indicating the start time of the object conveyance from a printer control unit.

15. An image forming apparatus, comprising:
   a sheet conveyance unit configured to convey a sheet for image formation;
   a printer unit configured to form an image on the sheet conveyed by the sheet conveyance unit;
   an antenna configured to transmit an interrogation signal and receive a response signal from a radio tag transmitting the response signal in response to the interrogation signal; and
   a radio tag communication control unit configured to cause the antenna to repeatedly transmit the interrogation signal from a start time of the sheet conveyance until a reception strength of the response signal received by the antenna is equal to or greater than a predetermined threshold, and then perform writing on the radio tag via the antenna once the reception strength of the response signal received by the antenna is equal to or greater than the predetermined threshold.

16. The image forming apparatus according to claim 15, wherein the radio tag communication control unit is configured to stop transmitting the interrogation signal if the reception strength is still less than the predetermined threshold after a predetermined time elapses after the start time of the sheet conveyance.

17. The image forming apparatus according to claim 15, wherein the radio tag attached the sheet.

18. The image forming apparatus according to claim 15, wherein the radio tag is a radio frequency identification (RFID) tag.

19. The image forming apparatus according to claim 15, further comprising:
   a transceiver circuit connected between the antenna and the radio tag communication control unit.

20. The image forming apparatus according to claim 15, further comprising:
   an interface unit connecting the radio tag communication control unit to the printer unit, wherein
   a signal from the printer unit received by the interface unit indicates the start time of the sheet conveyance.

* * * * *